Jan. 1, 1946.  H. KERSHAW  2,391,979
DIAMOND CUTTING MACHINE
Filed Dec. 7, 1943  5 Sheets-Sheet 1

Inventor
Henry Kershaw.
By B.P. Whitburn
Attorney

Inventor
Henry Kershaw.

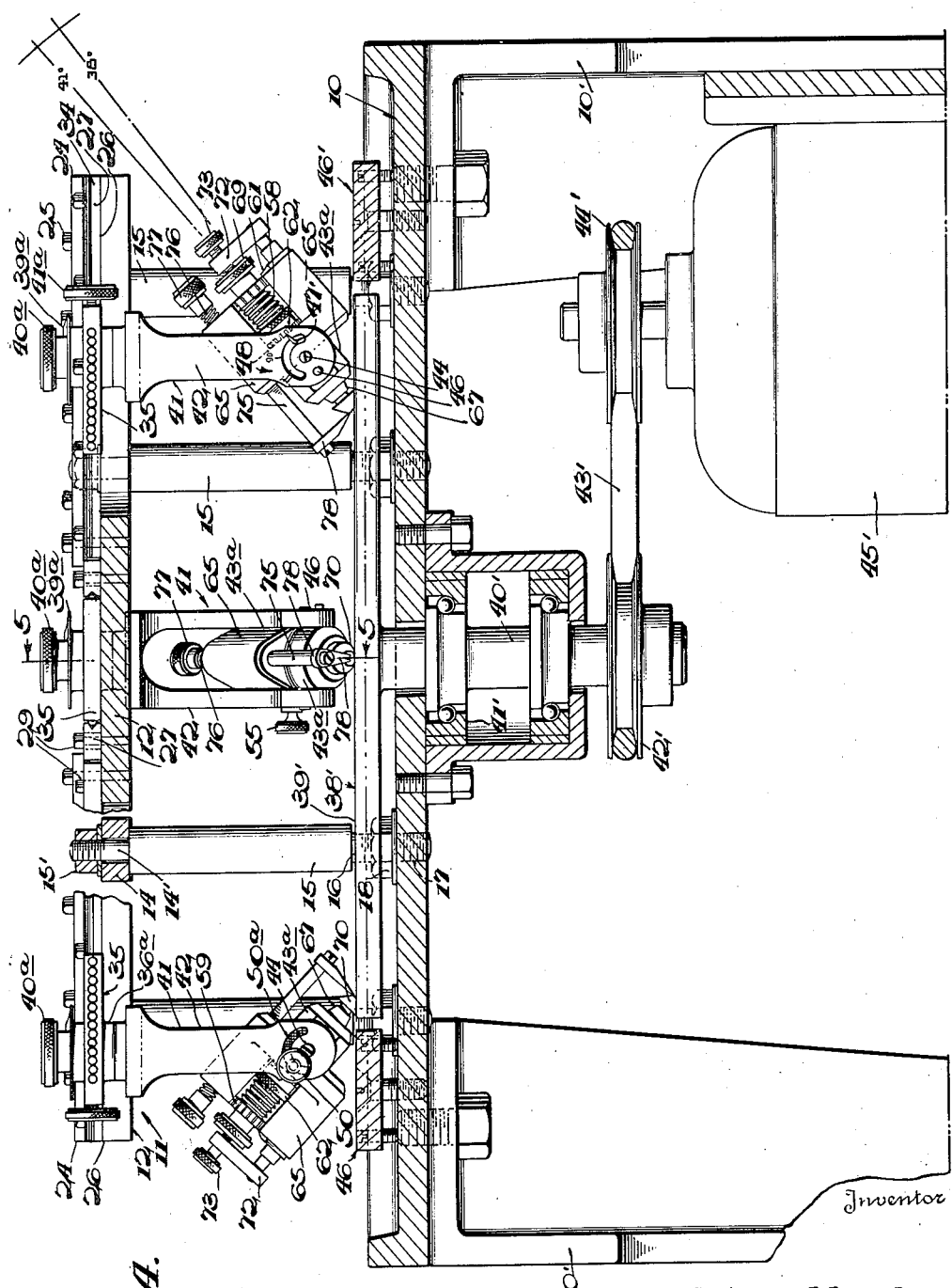

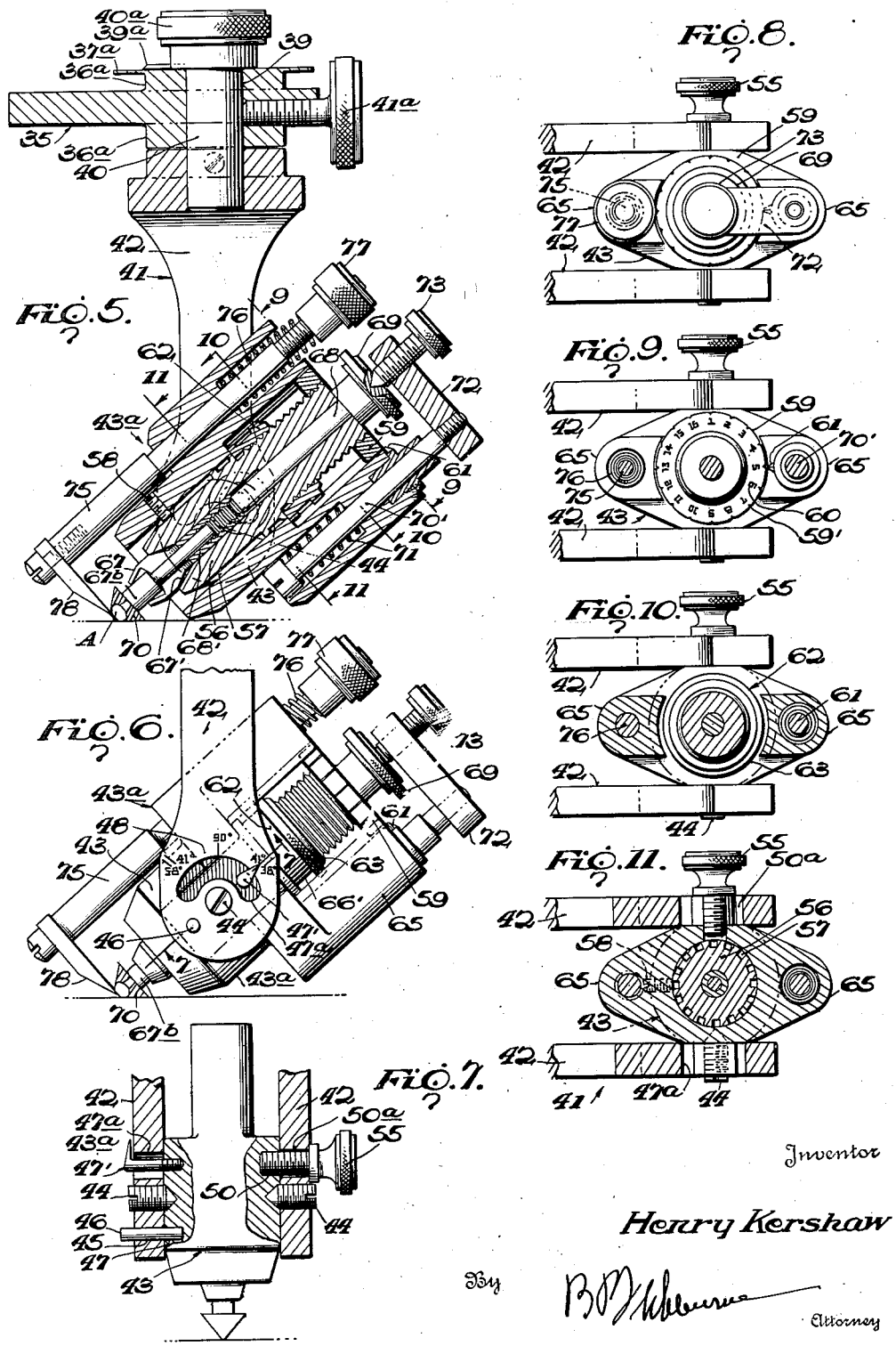

Jan. 1, 1946.  H. KERSHAW  2,391,979
DIAMOND CUTTING MACHINE
Filed Dec. 7, 1943  5 Sheets—Sheet 5
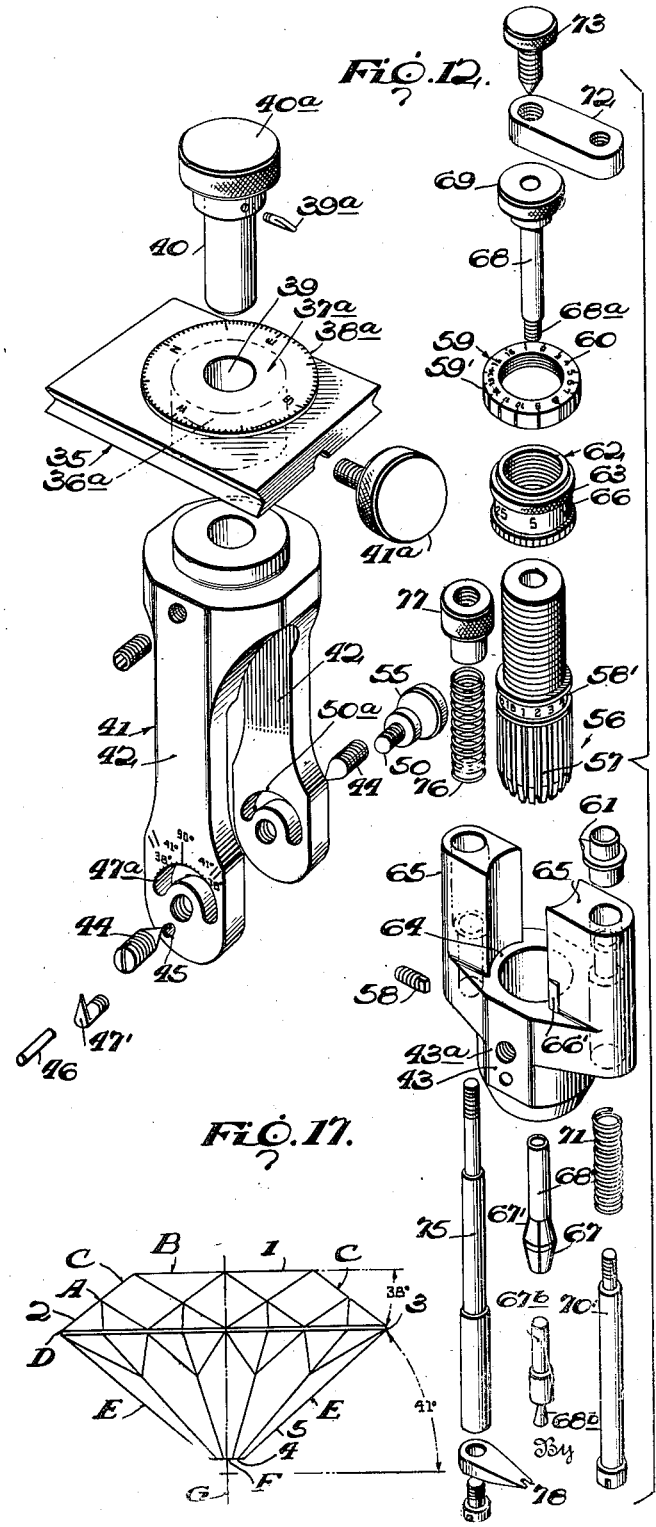
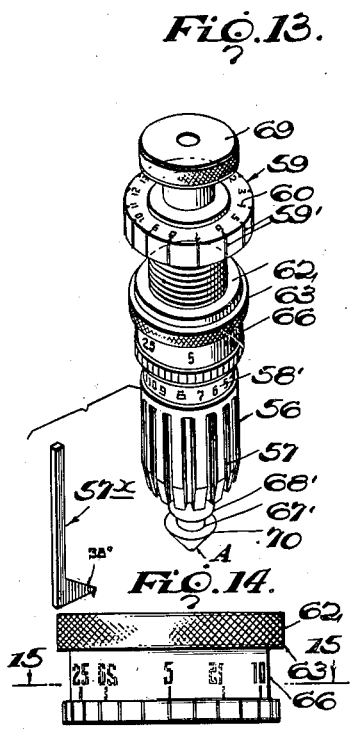
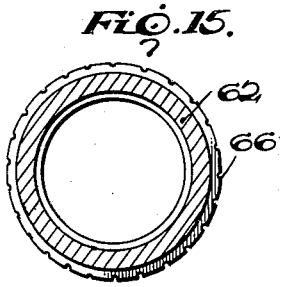
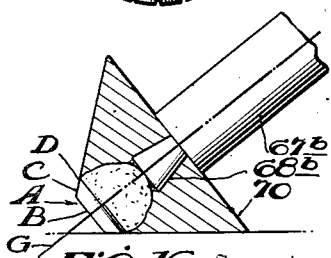
Inventor
Henry Kershaw.
Attorney Patented Jan. 1, 1946

2,391,979

UNITED STATES PATENT OFFICE 2,391,979

DIAMOND CUTTING MACHINE

Henry Kershaw, Belleville, N. J.

Application December 7, 1943, Serial No. 513,261

5 Claims. (Cl. 51—229.)

My invention relates to a machine for cutting diamonds.

An important object of the invention is to provide a machine of the above mentioned character which will properly locate the grain of the diamond with respect to the working face of the lapping wheel, and then cut the several facets.

A further object of the invention is to provide a machine of the above mentioned character which is adjustable for cutting diamonds of different sizes.

A further object of the invention is to provide a machine of the above mentioned character which will permit of the inspection of the facets, during the cutting operation.

A further object of the invention is to provide a machine of the above mentioned character which is accurate in operation.

A further object of the invention is to provide a machine of the above mentioned character which will save a great deal of time and labor in the cutting of diamonds.

Other objects and advantages of the invention will be apparent during the course of the following description.

Figure 1:
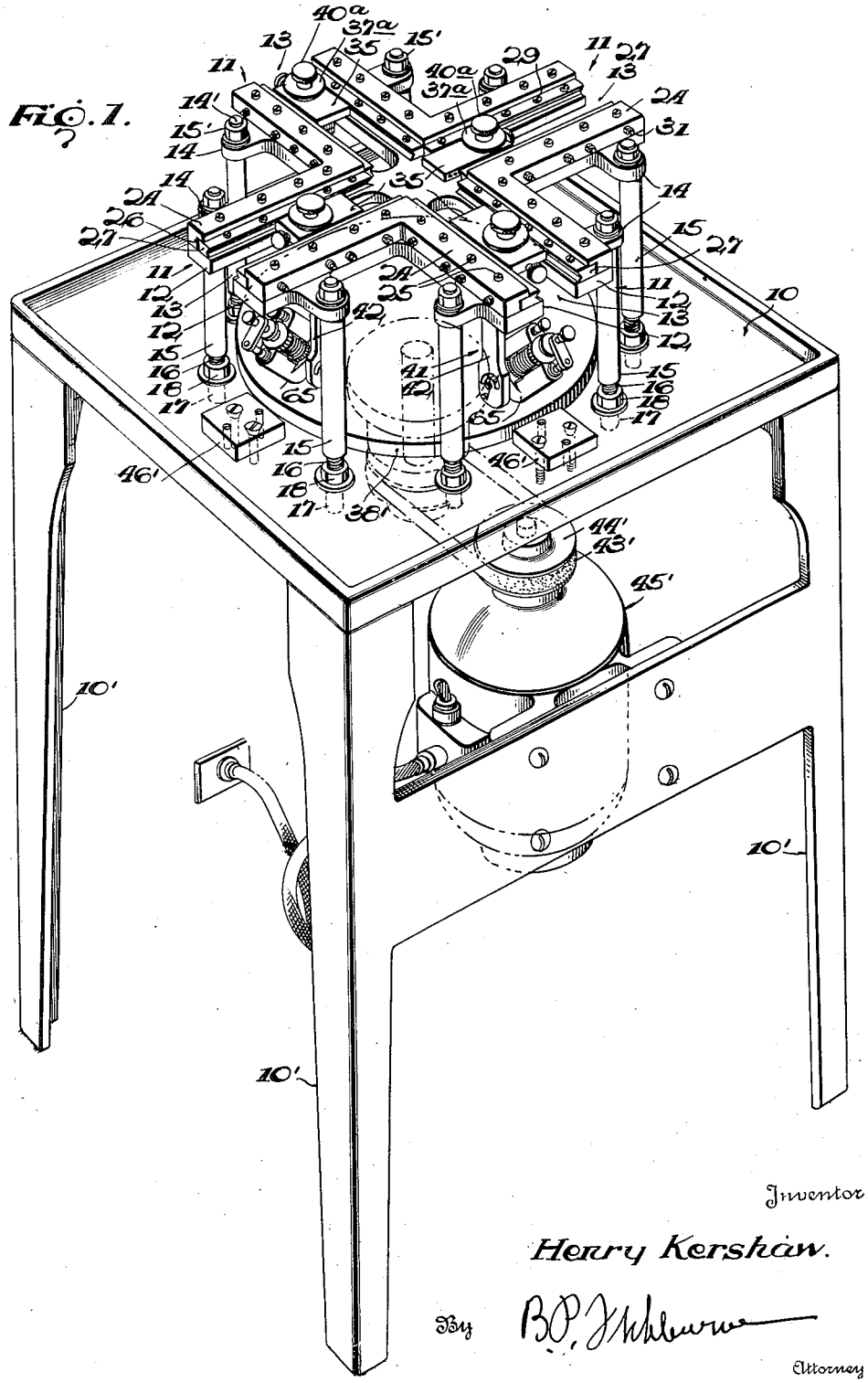
Figure 2:
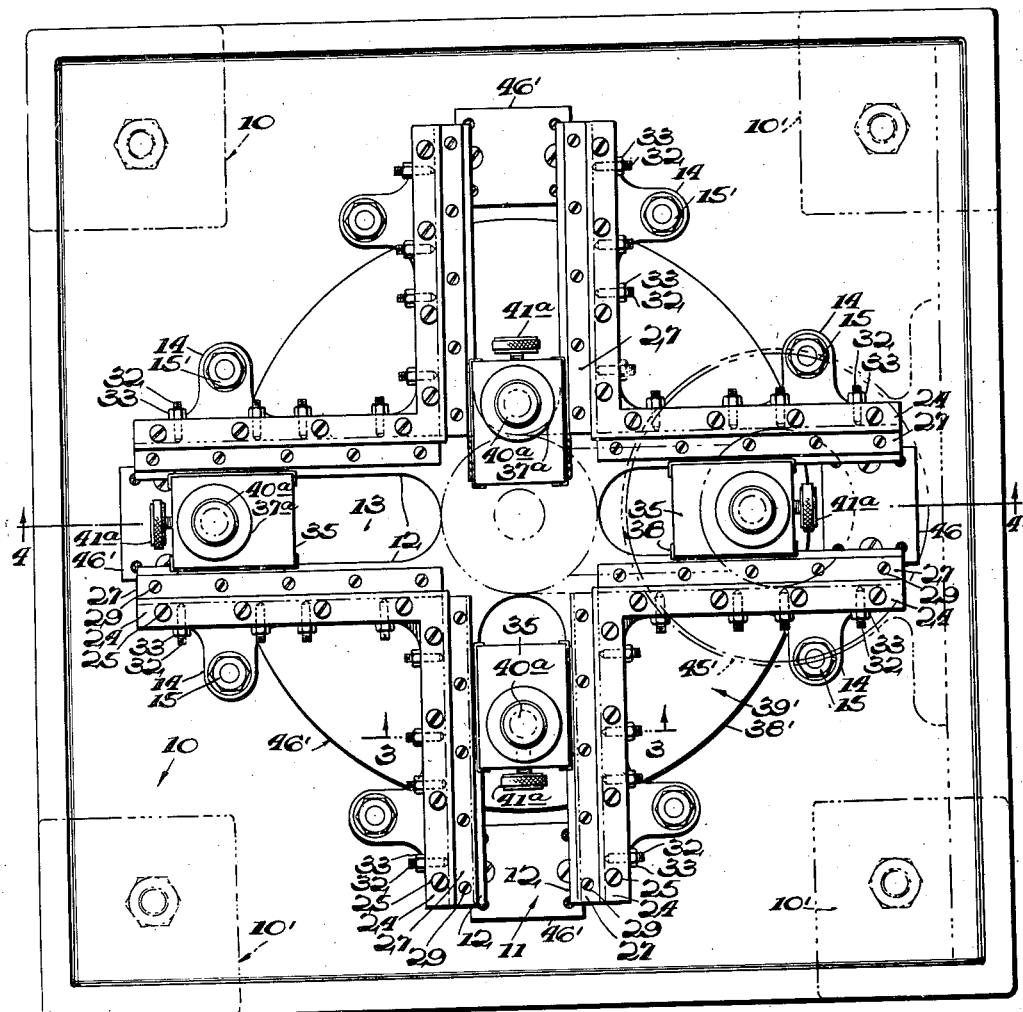
Figure 3:
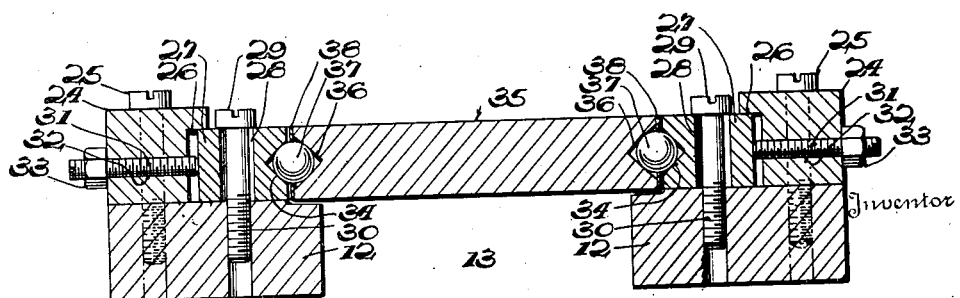

In the accompanying drawings forming a part of this application and in which like numerals are employed to designate like parts throughout the same, Figure 1 is a perspective view of a diamond cutting machine embodying my invention, Figure 2 is a plan view of the same, Figure 3 is a vertical section taken on line 3—3 of Figure 2, Figure 4 is a transverse vertical section taken on line 4—4 of Figure 2, Figure 5 is a central vertical section through the angle positioning device or unit, taken on line 5—5 of Figure 4, Figure 6 is a side elevation of the angle positioning device, associated elements being broken away, Figure 7 is a transverse section taken on line 7—7 of Figure 6, parts in elevation, Figure 8 is an end elevation of the angle positioning device, Figure 9 is a transverse section taken on line 9—9 of Figure 5, Figure 10 is a similar view taken on line 10—10 of Figure 5, Figure 11 is a similar view taken on line 11—11 of Figure 5, Figure 12 is an exploded perspective view of the angle positioning device and associated elements, Figure 13 is a perspective view of a diamond turning sleeve and associated gauge, Figure 14 is a side elevation of a depth gauge wheel, Figure 15 is a transverse section taken on line 15—15 of Figure 14, Figure 16 is a side elevation of a shank, the alloy having the diamond embedded therein being in section, and, Figure 17 is a side elevation of the cut diamond.

In the drawings, wherein for the purpose of illustration is shown a preferred embodiment of my invention, A designates a diamond, which has been cut, and has a table B, a pavilion C, a girdle D, a bottom E and a culet F. The pavilion C is ordinarily cut at an angle of 38° to the table B and the bottom E at an angle of 41° to the table. The line G is the central longitudinal axis of the cut diamond.

My machine comprises a table top 10, preferably supported table high by legs 10' and arranged horizontally.

Arranged above and spaced from the table top 10 are horizontal guides 11, rigidly secured together at their inner ends, and preferably disposed at a right angle to each other, in succession. Four of these guides are shown for coaction with four diamond cutting units, but the number may be varied. Each guide comprises horizontal beds 12, having their inner edges spaced to provide a passage 13. The beds 12 have ears 14, provided with openings to rotatably receive reduced cylindrical extensions 14', rigidly secured to vertical legs 15. The upper ends of the extensions 14' have screw threaded engagement with nuts 15'. The legs 15 may be turned upon their longitudinal axes and have reduced screw threaded extensions 16 rigidly secured to their lower ends. These extensions 16 are screw threaded for engagement within vertical screw threaded openings 17 formed in the table top 10. Lock nuts 18 engage the extensions 16 to lock the legs 15 in the adjusted position. By manipulation of the legs 15 the guides 11 may be held in a true horizontal position.

Arranged upon the beds 12 of each guide 11 are horizontal holding bars 24, rigidly attached to the beds 12 by screws 25 or the like. The bars 24 are provided upon their inner sides with grooves 26, receiving horizontal guide rails 27, which rest upon the beds 12. These guide rails have vertical openings 28, receiving screws 29, having screw threaded engagement within openings 30 in the beds 12. The openings 28 are larger in diameter than the screws 29 and will permit of the lateral adjustment of the guide rails 27, which may be clamped to the beds 12 in the selected adjusted position by manipulation of the screws 29. The guide rails 27 are adjusted laterally and inwardly by horizontal screws 31, contacting with their outer edges and engaging within screw threaded openings 32. These screws may be turned by a screw driver and locked in the selected adjusted position by lock nuts 33. The guide rails 27 have their inner vertical sides provided with grooves 34, which are V-shaped in cross section.

Numeral 35 designates a carriage, operating between the guide rails 27 and provided at its longitudinal edges with grooves 36, which are V-shaped in cross section and arranged opposite to the grooves 34. Operating within the grooves 36 and 34 are balls 37, retained in position by ball retainers 38, attached to the carriage 35. These balls 37 provided a suitable clearance between the carriage and the guide rails 27. It is thus seen that the carriage is supported in a true horizontal position, and may be shifted longitudinally in either direction, and may be moved rearwardly and entirely separated from the guide rails 27.

Arranged near and above the table top 10 is a horizontal lapping wheel 38', having its upper working face 39' held in a true horizontal position. This working face is scored generally radially and is coated or impregnated with a grinding compound formed from powdered diamonds and olive oil. The lapping wheel 38' is arranged beneath the guides 11 and these guides extend radially of the lapping wheel and are parallel with the working face 39'. The lapping wheel is supported and rotated by a vertical spindle 40', held in a bearing 41'. The spindle 40' carries a pulley 42', which is driven by a belt 43', engaging a pulley 44', in turn driven by a motor 45'.

The numeral 46' designates a stationary support-gauge, attached to the table top 10 and having its upper face held in a true horizontal position at the precise elevation of the working face 39' of the lapping wheel.

The carriage 35 is provided with a boss 36ª, extending above and below the same, and a dial 37ª is rigidly attached to the upper end of this boss. This dial is equipped with a scale 38ª including the points of the compass. The boss 36ª is provided with a central vertical opening 39, rotatably receiving a vertical spindle 40, which extends above the disc 37ª and carries a pointer 39ª, for coaction with the scale 38ª. The shank 40 is provided at its top with a milled head 40ª, by means of which it may be manually turned. The shank or spindle 40 is clamped in the selected position by a clamping screw 41ª, having screw threaded engagement with the carriage 35, as shown. Rigidly secured to the lower end of the spindle 40 is a yoke 41, including spaced sides 42. The yoke 41 may therefore be turned upon a vertical axis in either direction throughout 360°. This is done in arranging the grain of the diamond in proper relation to the working face of the lapping wheel 38'. When the yoke 41 is thus turned, the pointer 39ª will coact with the compass scale 38ª, to indicate the point on the scale at which the grain of the diamond is properly arranged with respect to the lapping wheel 38' so the diamond may be cut. If the yoke 41 should be moved from this selected position, before the cutting of the diamond is completed, the yoke 41 may be returned to the proper position by bringing the pointer 39ª to the proper point in the scale 38ª. The yoke 41 and spindle 40 and associated elements constitute a grain arranging device or unit.

The numeral 43ª designates an angle positioning device or unit, including a sleeve-holder 43, pivotally connected with the lower ends of the arms 42 by pivots 44. These pivots are disposed in a true horizontal position and are parallel with the working face 39' of the lapping wheel. The sleeve-holder 43 may therefore be turned in a vertical plane and is angularly adjustable with relation to the lapping wheel 38'.

One side 42 is provided with an opening 45, receiving a pin 46, to enter an opening 47 formed in the holding-sleeve 43, when the holding-sleeve is adjusted to an angle of 41° to the working face 39' of the lapping wheel. This angular adjustment of 41° is desired when the facets are to be cut on the bottom of the diamond. The pin 45 serves as a convenient indicator for this adjustment. I also mount a pointer 47' upon the sleeve-holder 43, to move therewith, and this pointer extends through a segmental slot 47ª, and travels in proximity to a scale 48, having designations 38°, 41° and 90°. The 41° adjustment is used to cut the facets on the bottom of the diamond, the 38° adjustment to cut the facets on the pavilion, and the 90° adjustment is to cut or polish the table of the diamond. After the holding-sleeve 43 has been vertically angularly adjusted, it is locked in the selected adjusted position by a screw 50, having screw threaded engagement with the holding-sleeve, and extending through a segmental slot 50ª in the other side 42. This screw 50 has a head 55.

The numeral 56 designates a cylindrical diamond turning sleeve for insertion within the cylindrical bore of the holding-sleeve 43 and has a snug sliding fit therein. The turning sleeve is provided upon its periphery with equidistantly spaced longitudinal grooves 57. Sixteen of these grooves are preferably employed. Any number of grooves 57 may be employed, but this number is preferably a multiple of four. The numeral 57ˣ, Figure 13, is a gauge to measure the angle of the facet being cut. The shank of this gauge is arranged within the selected groove 57 as indicated by the scale 58', and the angular face of the gauge engages the facet being cut. The holding-sleeve 43 has a locking pin 58 projecting into its bore, at a point between its ends, and this locking pin is adapted for insertion within a selected groove 57. The forward end of the turning sleeve 56 is preferably tapered so that the sleeve 56 may be conveniently inserted within the holding-sleeve 43. When the turning sleeve 56 is inserted within the holding-sleeve 43 for a short distance only, it may be turned upon its longitudinal axis with relation to the holding-sleeve, until the selected adjustment is reached, after which the turning sleeve 56 is shifted forwardly and the locking pin 58 will enter the proper groove 57 and the turning sleeve will be held against relative turning movement.

The turning sleeve 56 is provided with a scale 58' having characters running from 1 to 16 inclusive and designating the grooves 57. At its top, the turning sleeve has a head 59, rigidly secured thereto, and notched at its periphery, as indicated at 59'. There are 16 of these notches and they are equidistantly spaced and correspond to and are in alignment with the grooves 57. The head 59 is provided upon its upper face with a scale 60, extending from 1 to 16 inclusive, to coact with stationary pointer 61 and designating the notches 59'. The scales 59' and 60 are identical and both serve to designate the grooves 57.

Rotatably mounted upon the turning sleeve 56 and having screw threaded engagement therewith, is a depth gauge wheel 62, extending radially beyond the turning sleeve 57, and having an upper milled end 63, for turning it. The lower end of this depth gauge wheel 62 rests upon shoulders 64 formed in arms 65, rigidly secured to the holding-sleeve 43, and extending longitudinally above the same. The screw threads of the turning sleeve 56 and of the depth gauge wheel 62 are cut 40 threads to the inch so that the depth gauge wheel will be shifted axially for one thousandths of an inch when the depth gauge wheel 62 is turned one step. The depth gauge wheel 62 is provided upon its periphery with a scale 66, graduated in one thousandths of an inch, the distance between one point in this scale to the next point indicating that the depth gauge wheel has been adjusted to control the longitudinal movement of the turning sleeve 56 for one-thousandths of an inch. The scale 66 coacts with a stationary pointer 66' carried by the holding-sleeve 43.

The numeral 67 designates a chuck having a tapered shoulder 67' and this chuck is carried by a tubular shank 68', extending into the bore of the turning sleeve 57, and having its upper end screw threaded for receiving the screw threaded extension 68a of a screw 68, carrying a head 69, for turning it. The chuck 67 grips a shank 67b, having a reduced extension 68b, which is tapered and increases in diameter toward its free end. The diamond A is arranged upon the free end of the extension 68b, which free end is flat and is at a right angle to the longitudinal axis of the socket 67 and turning sleeve 57. The diamond A is imbedded in an alloy 70, which is cast about the extension 68b and hence the diamond is securely anchored to this extension. The diamond A is secured to the extension 68b so that the facets are to be cut in the pavilion C and hence the table B is remote from the free end of the extension 68b but is parallel therewith.

One arm 65 has a longitudinal opening to receive a reciprocatory rod 70', urged forwardly by a spring 71. At its rear end the rod 70' carries an overhanging arm 72, carrying an adjusting screw 73. This screw 73 is adapted to press against the head 69 and the spring 71 will therefore yieldingly move the turning sleeve 56 forwardly. The arms 72 may be swung laterally when the screw 73 disengages the head 69, so that the turning sleeve 56 may be moved rearwardly out of the holding sleeve 43, in whole or in part. The rod 70' can turn upon its axis.

The other arm 65 has a longitudinal opening to receive a rod 75 to turn and move longitudinally therein. This rod is urged rearwardly by a spring 76, engaging a nut 77 having screw threaded engagement therewith. At the forward end of the rod 75 is a laterally extending finger 78, rigidly secured thereto. This finger tapers forwardly and its free end is adapted to engage the table B, or the bottom of the diamond adjacent to the culet, or the culet. This finger serves as additional means to hold the diamond in place and prevents the same from separating from the alloy 70, if it should become loose therein.

The operation of the machine is as follows: The diamond A is rigidly secured to the turning sleeve 56 by the chuck 67 and associated elements and the axis G of the diamond coincides with the central longitudinal axis of the sleeve 56.

The sleeve 56 may be turned so that the "1" point of the scale 60 will be at the pointer 61. The carriage 35 is moved rearwardly over the stationary support-gauge 46' and the angle positioning device 43a is arranged at the selected angular position, such as 38°, as the pavilion C is to be cut, and locked in this position to the yoke 41. The depth gauge wheel 62 is fed rearwardly and spaced from the shoulders 64. The turning sleeve 56 is now moved forwardly and the diamond A brought to rest upon the stationary support-gauge 46' and the depth gauge wheel 62 is screwed forwardly so that it will contact with the shoulders 64 without shifting the turning sleeve 56 rearwardly. This adjustment will represent the starting position of the turning sleeve 56 and the diamond. When the depth of the facets to be cut in the first group has been determined, the depth gauge wheel 62 is turned to feed the same rearwardly upon the turning sleeve 56 and space the same from the shoulders 64. The depth gauge wheel 62 may be turned to cut the facets any desired depth, which will depend upon the size of the diamond. The depth of the cut may be one-thousandth of an inch or any other depth. The carriage 35 is now moved forwardly to position the diamond over the working face of the lapping wheel 38', the turning sleeve 56 being manually drawn rearwardly while the diamond is being transferred from the stationary support gauge 46' to the lapping wheel 38' and then allowed to be gradually fed forwardly to engage the working face 39', and pressed into engagement with this working face by the spring 71. The lapping wheel 38' is rotating at the speed usually employed in cutting diamonds. If the diamond cuts properly it is known that the grain of the diamond is properly arranged with respect to the lapping wheel. This is determined by removing the turning sleeve 56 from the holding sleeve 43 and inspecting the diamond by the use of a magnifying glass. If the cut is not satisfactory, or if the diamond is not cutting, then the yoke 41 is turned upon its vertical axis and several cutting tests made, until the cut is satisfactory, which is determined by an inspection of the diamond. It is then known that the grain of the diamond is properly located with respect to the lapping wheel 38', after the cutting action becomes satisfactory. The yoke 41 is then locked in the adjusted position by means of the screw 41a. The diamond now remains in contact with the working face of the rotating lapping wheel 38', and is yieldingly pressed toward the same and is fed to the working face as the cutting of the facet continues, until the facet is cut to the selected depth, which is determined when the depth gauge wheel 62 engages the shoulders 64. To cut the next facet, the arm 72 is retracted and the turning sleeve 56 moved rearwardly and turned to bring the next facet to the cutting position. The next facet may be opposite the first facet, or the facets may be cut in succession. If the next facet to be cut is opposite the first facet, the turning sleeve 56 is turned so that the point "9" will be at the pointer 61. Each facet is cut by the action of the lapping wheel 38' in the same manner. Then the remaining facets of the first group consisting of four facets would be cut by turning the turning sleeve 56 so that the "5" point or "13" point of the scale 60 would be at the pointer 61. If the facets are cut in succession, the turning sleeve 56 would be turned to bring the points "1," "5," "9," and "13," of the scale 60 at the pointer 61. To cut the next set of facets consisting of four facets, the turning sleeve 56 is adjusted to bring the points "3," "7," "11," and "15" to the pointer 61. If only eight facets are to be cut, this would end the cutting operation. To cut the next group of facets, consisting of eight facets, the turning sleeve 56 is turned to bring the points "2," "4," "6," "8," "10," "12," "14," and "16," to the pointer 61, in succession. This action cuts 16 facets and cuts the corners of the previous 8 facets. The cutting of the diamond is usually done upon the inner portion of the working face 39' and the carriage 35 may be stationary. During the cutting action the carriage 35 may be moved longitudinally in either direction so that the diamond is engaged by different radial portions of the working face 39'.

It is thus seen that means are provided for holding the diamond with its axis at a selected angle with respect to the working face 39' of the lapping wheel. Means are also provided for bodily turning the diamond about a vertical axis for locating the grain of the diamond with respect to the working face 39', without disturbing the angular adjustment of the diamond. Means are provided to turn the diamond upon its axis to cut the facets and to press the diamond into engagement with the working face 39' to effect the cut.

The foregoing operation is that practiced in cutting the facets upon the pavilion C. The diamond is now separated from the chuck 67 and inverted and again attached to the turning sleeve with its lower portion or bottom E arranged next to the lapping wheel 38'. The facets are now cut in the bottom E in the same manner as described in connection with the pavilion.

The machine can also be used to polish the table B and the facets. When polishing the table B the pointer 47' would be at the 90° position, when polishing the facets of the pavilion C the pointer 47' would be at the 38° position and when cutting or polishing the facets of the bottom E the pointer 47' would be at the 41° position. The polishing action is effected when the depth gauge wheel 62 engages the shoulders 64, so that there is no further feeding of the diamond toward the working face 39'. The polishing is preferably done near the radial outer portion of the lapping wheel while the carriage 35 is being reciprocated.

It is to be understood that the form of my invention herewith shown and described is to be taken as a preferred example of the same, and that various changes in the shape, size, and arrangement of parts may be resorted to without departing from the spirit of my invention or the scope of the subjoined claims.

Having thus described my invention, what I claim is:

1. In a machine for cutting diamonds, a lapping wheel having a working face, a support arranged near the working face, a holding sleeve angularly adjustably mounted upon the support, a turning sleeve mounted within the holding sleeve to turn and move axially therein, the turning sleeve having longitudinal grooves, a locking element carried by the holding sleeve to enter a selected groove, yielding means to move the turning sleeve axially toward the working face, adjustable means to regulate the extent of such movement of the turning sleeve, and means to mount a diamond upon the turning sleeve and arranging its axis parallel with the axis of the turning sleeve.

2. In a machine for cutting diamonds, a lapping wheel having a working face, a support mounted near the working face, a holding sleeve mounted upon the support to be arranged at an angle to the working face, said holding sleeve having a shoulder, a turning sleeve mounted within the holding sleeve to turn and move axially therein, the turning sleeve having longitudinal grooves and a screw threaded portion, a locking element carried by the holding sleeve to enter a selected groove, means to indicate the extent of turning movement of the turning sleeve, a depth gauge wheel having screw threaded engagement with the screw threaded portion and arranged to engage the shoulder, means to move the turning sleeve axially toward the working face, and means to mount a diamond upon the turning sleeve.

3. In a machine for grinding or polishing diamonds or the like, a turning sleeve, an adjustable chuck mounted within the turning sleeve, and a shank held by the chuck, said shank having a tapered axial extension decreasing in diameter toward the shank, the forward end of the extension being adapted to engage with the diamond and the extension to be embedded within a fusable metal which also embeds the diamond.

4. In a machine for grinding or polishing diamonds or the like, a support, a lapping wheel mounted upon the support and having a working face, a member to be arranged at an angle with relation to the working face of the lapping wheel, said member having an opening passing through its forward and rear ends, an element having means at its forward end to hold a diamond or the like, the element being adapted to be turned upon its longitudinal axis for cutting different facets upon the diamond, the element being arranged within the opening of the member, the element being movable axially within the opening of the member toward the working face of the lapping wheel and accurately guided by the member during such axial movement and held against turning movement upon its longitudinal axis, yielding means to automatically move the element axially toward the working face of the lapping wheel, adjustable means to regulate the extent of such axial movement, the diamond holding means of the element being smaller than the opening of the member so that said element may be separated from the member by passing the diamond holding means through the opening of the member when the element is moved rearwardly with relation to the member, and means mounted upon the support and carrying the member and turning upon an axis substantially perpendicular to the working face of the lapping wheel so that the grain of the diamond may become properly arranged with respect to the working face.

5. In a machine for grinding or polishing diamonds or the like, a support, a lapping wheel mounted upon the support and having a working face, a holding sleeve to be arranged at an angle with relation to the working face of the lapping wheel, said holding sleeve having a bore which is not longitudinally tapered, an element which is not longitudinally tapered slidably mounted within the bore of the holding sleeve and movable axially therein toward the working face of the lapping wheel and accurately guided during such axial movement and held against turning movement upon its longitudinal axis, yielding means to automatically move the element axially toward the working face of the lapping wheel, an adjustable stop element mounted upon the first named element and arranged to engage the holding sleeve to regulate the extent of axial movement of the first named element, diamond holding means mounted upon the first named element and being smaller than the bore of the holding sleeve so that the diamond holding means may pass through the bore when the first named element is separated from the holding sleeve upon the rearward movement of the first named element from the holding sleeve, and means mounted upon the support and carrying the holding sleeve and turning upon an axis substantially perpendicular to the working face of the lapping wheel so that the grain of the diamond may become properly arranged with respect to the working face.

HENRY KERSHAW.